United States Patent [19]

Morisada

[11] Patent Number: 4,881,170
[45] Date of Patent: Nov. 14, 1989

[54] INSTRUCTION PREFETCH CONTROL APPARATUS

[75] Inventor: Tsuyoshi Morisada, Tokyo, Japan

[73] Assignee: NEC Corporation, Tokyo, Japan

[21] Appl. No.: 117,152

[22] Filed: Oct. 23, 1987

[30] Foreign Application Priority Data

Feb. 28, 1986 [JP] Japan ................................. 61-44478
Feb. 28, 1986 [JP] Japan ................................. 61-44479

[51] Int. Cl.[4] .............................................. G06F 9/38
[52] U.S. Cl. .................................. 364/200; 364/261.3; 364/261.7
[58] Field of Search ... 364/200 MS File, 900 MS File

[56] References Cited

U.S. PATENT DOCUMENTS

| 4,200,927 | 4/1980 | Hughes et al. | 364/200 |
| 4,477,872 | 10/1984 | Losq et al. | 364/200 |
| 4,594,659 | 6/1986 | Guenthner et al. | 364/200 |
| 4,604,691 | 8/1986 | Akagi | 364/200 |
| 4,679,141 | 7/1987 | Pomerene et al. | 364/200 |
| 4,691,277 | 9/1987 | Kronstadt et al. | 364/200 |
| 4,763,245 | 8/1988 | Emma et al. | 364/200 |
| 4,764,861 | 8/1988 | Shibuya | 364/200 |

FOREIGN PATENT DOCUMENTS 0109655 5/1984 European Pat. Off. .
WO85/01368 3/1985 PCT Int'l Appl. .

OTHER PUBLICATIONS

Wescon Conference Record, vol. 25, Sep. 1981, (El Sequndo, Calif., U.S.A.), S. Walters, "Memory Management Made Easy with the Z8000", pp. (9/3) 1-9.
Derwent Publications, vol. 8608, Mar. 8, 1986, (London, GB) & SU, A, 942018, (Sakhin Yu Kh).
IBM Technical Disclosure Bulletin, vol. 25, No. 1, Jun. 1982, (New York, U.S.A.), J. J. Losq, "Generalized History Table for Branch Prediction", pp. 99-101.
New Electronics, vol. 15, No. 16, Aug. 1982, (London, GB), C. Rada, "High-Level Processor Architecture", pp. 29, 30, 32.

Primary Examiner—Gary V. Harkcom
Assistant Examiner—Michael A. Jaffe
Attorney, Agent, or Firm—Foley & Lardner, Schwartz, Jeffery, Schwaab, Mack, Blumenthal & Evans

[57] ABSTRACT

An information processing system for performing a prior control in determining a branch destination address by an execution of a branch instruction, includes a branch history table for storing prior branch destination address due to the fact that the possibility of branching to the prior branch destination address is high. By storing, in the branch history table, the branch destination address together with residual instruction number from the branch destination address to segment boundary, it is possible to restrict an instruction prefetch beyond the boundary area of a main memory to thereby prevent an excessive request from being produced. By storing, in the branch history table, the branch destination address together with mode information, it is possible to prevent an access to the main memory in a different mode from that at an instruction prefetch from occurring.

2 Claims, 6 Drawing Sheets

INSTRUCTION PREFETCH CONTROL APPARATUS

TECHNICAL FIELD

The present invention relathes to an instruction prefetch control apparatus for use in a data processing system with the capability of instruction prefetching.

BACKGROUND OF THE INVENTION

In a data processing system for storing an instruction group containing at least one branch instruction in the form of an instruction sequence, the processing of the branch instruction is executed in the following manner.

The branch instruction is supplied to a data processor first. Instructions following the branch instruction are then prefetched, and an instruction to be executed subsequently is decided by executing the branch instruction. An example of such a system is disclosed in U.S. Pat. No. 4,200,927. In the disclosed system, however, data processing speed is limited due to the fact that instruction prefetch control is suspended until a result of execution of the branch instruction is clarified.

In order to solve this problem, a system has been proposed in which a result of the execution of a branch instruction is predicted and the instruction prefetch is performed based on the prediction. A data processor can operathe with a minimum processing delay if the prediction is correct. As a prediction system for performing the above, there are several examples conventionally.

A first one of them is a system in which either a "success" side or an "unsuccess" side of predicted branch distination for every branch instruction is predicted.

In another example, a branch destination is predicted on the basis of facts in the past. That is, this system employs the fact that, for a branch instruction, a branch destination has been clarified in a prior result of the same branch instruction and a current branch destination is predicted on the basis of the prior result to improve an accuracy of prediction. A typical example of such a system is disclosed in U.S. Pat. No. 4,477,872.

As another example, there is a system having a number of branch instruction flags for predicting branch destinations corresponding to branch instructions and the flags are referred to in response to occurrences of branch instructions to predict the branch destinations.

In any of these systems, however, the readout and decoding of the branch instruction are required and data processing is delayed by the readout and decoding time even when the prediction is correct.

U.S. Pat. No. 4,604,691 discloses a prediction system for solving the above-mentioned problem. In the latter system, a branch destination address of a branch instruction, which is contained in a block of an instruction cache memory which is a copy of the instruction portion of a main memory, is stored in a memory unit as an address of a block to be fetched subsequent to the former block corresponding to the block of the instruction cache memory. In an instruction prefetch, the memory unit is accessed simultaneously with the accessing of the instruction cache memory to read out the branch destination address, and the address of the instruction to be prefetched is determined by the branch destination address read out. This system is effective to speed up the data processing contrarily to the previously mentioned systems. However, in this system, the prediction is performed by using a block-to-block correspondency of the instruction cache memory. Therefore, when a plurality of branch instructions exist in a block, it is impossible to predict correspondingly to respective branch instructions. Thus, accuracy of prediction in this system is relatively low.

European Patent Application Publication No. 0109655A2 published on May 30, 1984 discloses a prediction system of high accuracy. This system utilizes a branch history table in general. In this system, the address of a branch instruction and a branch destination address are paired and stored in the table. By searching the table with an instruction prefetch address in prefetching the instruction, it is possible to obtain an address of a branch destination to be executed subsequently.

There are many systems of zone management of the main memory. One of them is to manage it by means of segments represented by segment descriptors. Each segment descriptor describes information such as a base address, a boundary and a flag which are necessary for segment management. The base address and the boundary indicate a lower and upper limits of the zone, respectively, and the flag gives a segment access mode.

In the data processing system which utilizes the segments to manage the main memory, the segment descriptor which indicates the size of the segment in picking up an instruction addressed by a branch destination address is unknown until the branch instruction is decoded completely. Therefore, when it is branched to around a boundary area of the segment zone, it may occur to prefetch an instruction even when it is an access to an area outside the segment zone.

Further, in this system, the prefetch of the branch destination instruction is performed prior to the decoding stage of the branch instruction. Therefore, there may be a plurality of instructions from a time at which the branch instruction is prefetched to a time at which the branch instruction is decoded. When an instruction instructing an access mode change for the memory means is contained in a plurality of instructions, the memory means may be accessed in an erroneous access mode.

SUMMARY OF THE INVENTION

One object of this invention is, therefore, to provide an instruction prefetch control apparatus free from the above-mentioned disadvantages.

According to a first embodiment of this invention, there is provided an instruction prefetch control apparatus which comprises a branch history table for storing a branch instruction address and a branch destination address of the branch instruction as a pair. The control apparatus further comprises a search unit for searching the branch history table with an instruction prefetch address, a unit for storing, in the branch history table, a residual instruction number indicative of the number of possible instruction prefetch operations from a branch destination corresponding to the branch destination address, a residual instruction number information storing unit for storing the residual instruction number information obtained from the branch history table and number control unit responsive to the residual instruction number information from the residual instruction number information storing unit for controlling the number of instruction prefetches of a predicted branch destination.

According to a second embodiment of the present invention, there is provided an instruction prefetch control apparatus having a branch history table for storing paired branch instruction address and a branch destination address of the branch instruction to execute an instruction prefetch. The control apparatus further comprises a search unit for searching the branch history table according to an instruction prefetch address, a unit for storing branch destination memory access control information in the branch history table corresponding to the branch destination address and a unit for checking memory access of instruction prefetch on the basis of an access control information read out from the branch history table.

BRIEF DESCRIPTION OF THE DRAWINGS

The present invention will be described in detail with reference to the accompanying drawings in which.

In the drawings, same reference numerals denote the same structural elements, respectively, and data an addresses are supplied to respective lines in bit-parallel or bit serial form.

DETAILED DESCRIPTION OF THE PREFERRED EMBODIMENTS

Figure 1:
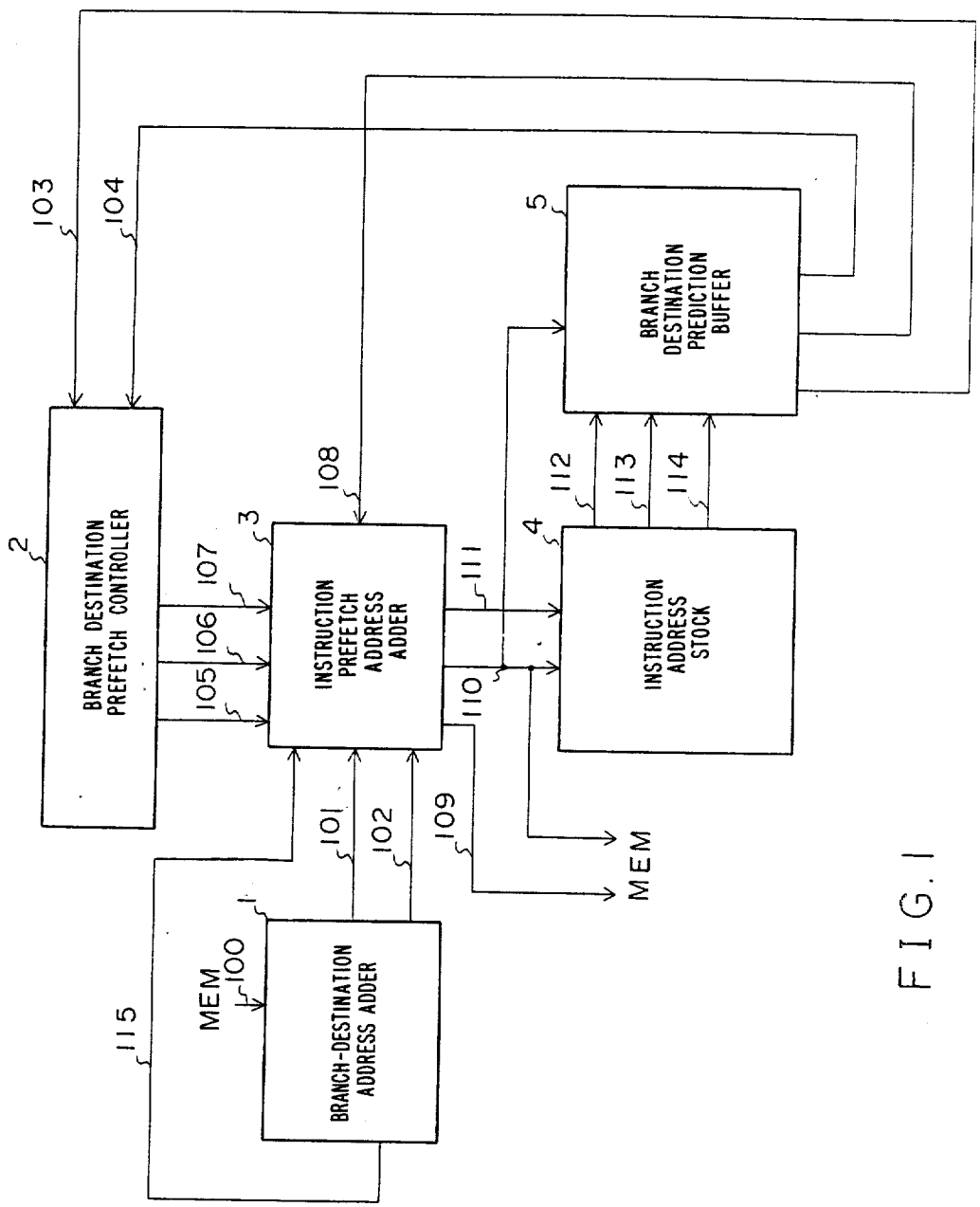
FIG. 1 is a block diagram of an embodiment of the present invention.

Referring to FIG. 1, a preferred embodiment of the present invention comprises a branch-destination-address adder 1 for calculating an actual-branch-destination address, a branch-destination-prefetch controller 2 for performing a prefetch control of a predicted branch destination, an instruction-prefetch-address adder 3 for performing an instruction-prefetch-address calculation, an instruction address stack 4 for storing instruction addresses and a branch-destination-prediction buffer 5 for detecting whether or not the instruction address of the predicted branch destination is the same as the address of the branch instruction, the instruction addresses stored in the instruction address stack 4 being for the branch-destination-prediction buffer 5.

An operation of the embodiment of the present invention will be described in detail with reference to FIGS. 1 through 6.

First, an instruction prefetch processing in a write-in operation will be described in detail with reference to FIGS. 1 and 4.

Figure 4:
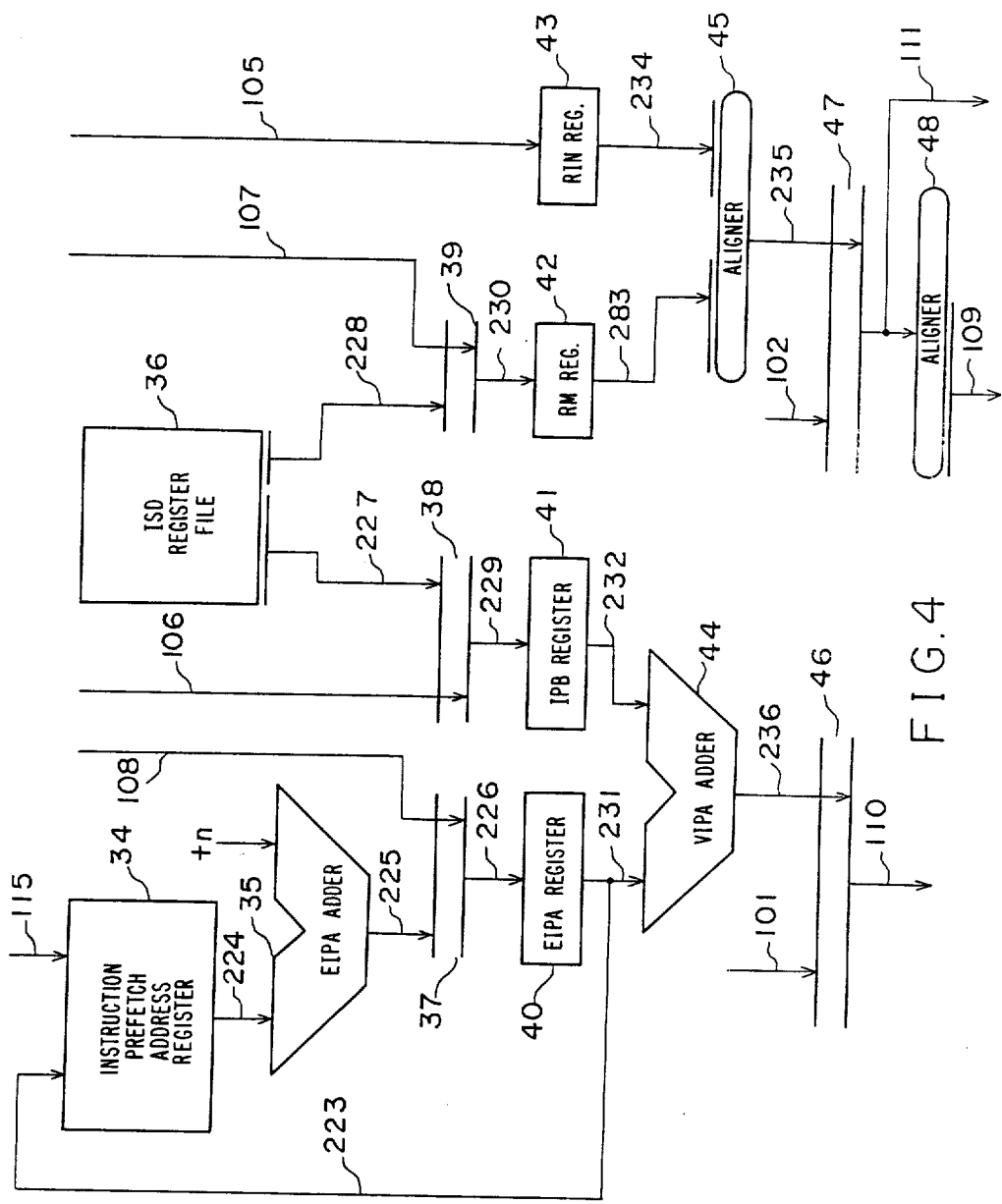
FIG. 4 is a detail block diagram of an instruction prefetch address adder 3 in FIG. 3.

A preceding prefetch address is derived from an instruction-prefetch-address register 34 shown in FIG. 4. The register 34 is included in the instruction-prefetch-address adder 3 shown in FIG. 1 and is supplied to an effective-instruction-prefetch-address adder 35. The prefetch-address adder 3 adds n bythes to the preceding prefetch address and a result is stored in an effective-instruction-prefetch-address register 40 through a selector 37. On the other hand, a base address is supplied from a register file 36 of a segment descriptor through a line 227, a selector 38 and a line 229 to an instruction-prefetch-base register 41 and stored therein.

An effective address for the instruction prefetch which is derived from the register 40 is stored in the address register 34 through a line 223 and at the same time supplied to a virtual-instruction-prefetch-address adder 44. The adder 44 functions to sum the effective address for the instruction prefetch supplied thereto from the register 40 and the base address supplied thereto from the register 41 to produce a virtual address for the instruction prefetch.

The virtual address is supplied through a line 236, a selector 46 and a line 110 to a virtual address register (49 in FIG. 5) included in the instruction address stack 4, stored therein and supplied to a main memory (not shown). An instruction is derived from the main memory in response to the virtual address which is supplied through a line 100 to the branch destination address adder 1.

Then, the control is shifted to an instruction processing of the write-in operation.

Figure 2:
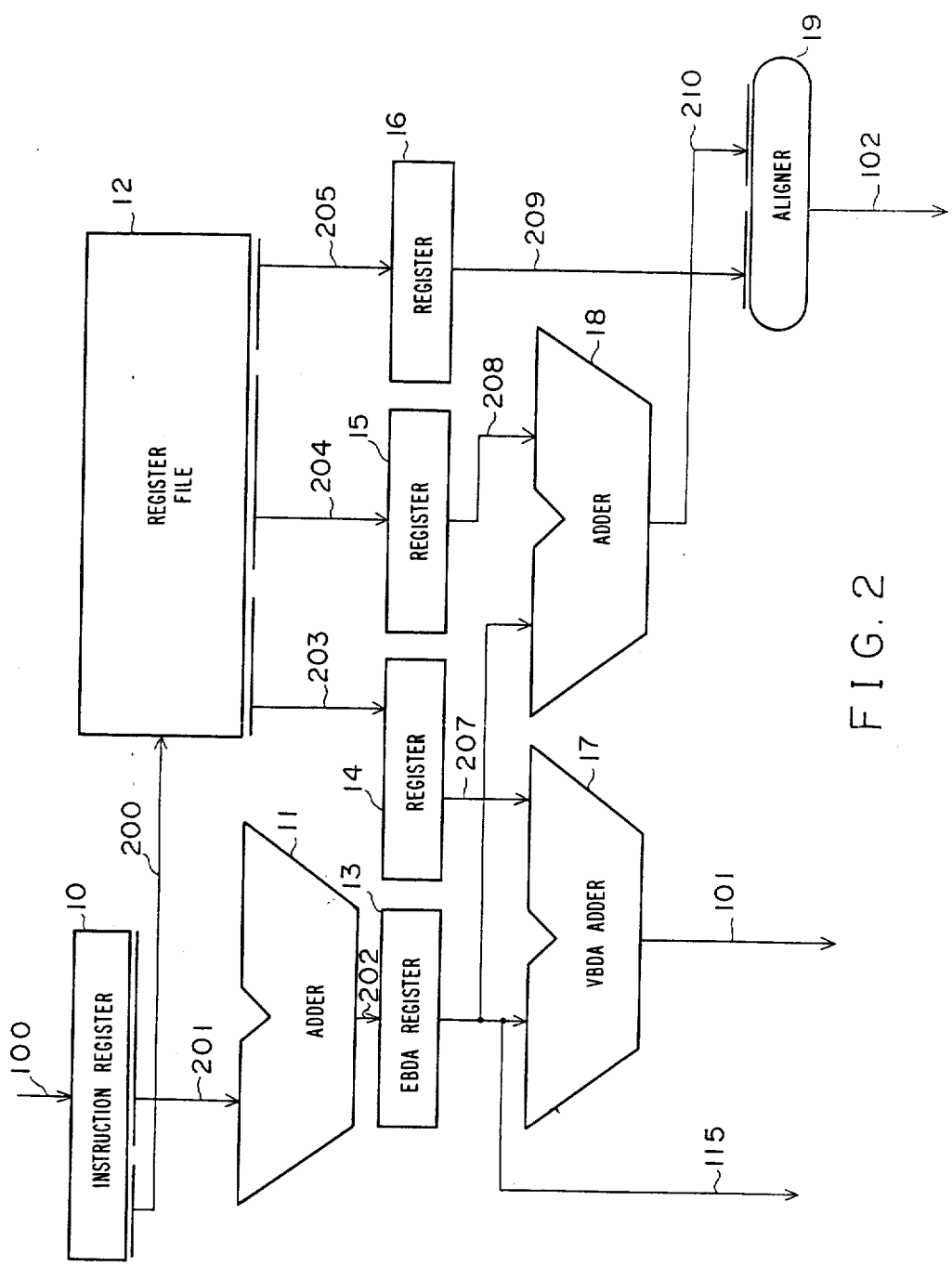
FIG. 2 is a detail block diagram of a branch destination address adder shown in FIG. 1.

Referring to FIGS. 1 and 2, the instruction supplied from the main memory through the line is stored in an instruction register 10. The branch destination address stored in the instruction register 10 is supplied through a line 201 to an adder 11 to generate an effective-branch-destination address and stored through a line 202 in an effective branch destination address register 13.

On the other hand, the base address of the segment descriptor read out from a register file 12 through a line 203, in response to an operation (OP) code give through a line 200 from this instruction register 10, is stored in a register 14. At the same time as this storing operation, a boundary address of the segment descriptor is supplied though a line 209 to a register 15 and stored therein. The mode information of the segment descriptor is supplied through a line 205 to a register 16 and stored therein.

The mode information may include, for example, a master mode, a privilege mode and a cache bypass mode. The effective branch destination address stored in the register 13 is delivered through a line 115 to an instruction-prefetch-address register 34 and used to prefetch a next instruction. A virtual-branch-destination-address adder 17 sums the effective branch destination address from the register 13 and the base address from the register 14 to send out to a line 101 a virtual-branch-destination address. An adder 18 is provided for the calculation of the number of destination instructions left unused subtracts the effective-branch-destination address delivered by the register 13 from the boundary delivered from the register 15 and supplies the number obtained to an aligner 19 through a line 210. The aligner 19 sends out the mode information supplied from the register 16 through the line 209 and the number of destination instructions left unused onto a line 102.

Referring to FIGS. 1 and 4, the virtual-branch-destination address delivered through the line 101 is sent through a selector 46 to the line 110. At the same time, the number of branch destination instruction left unused and the mode information are sent through a selector 47 onto a line 111.

Figure 5:
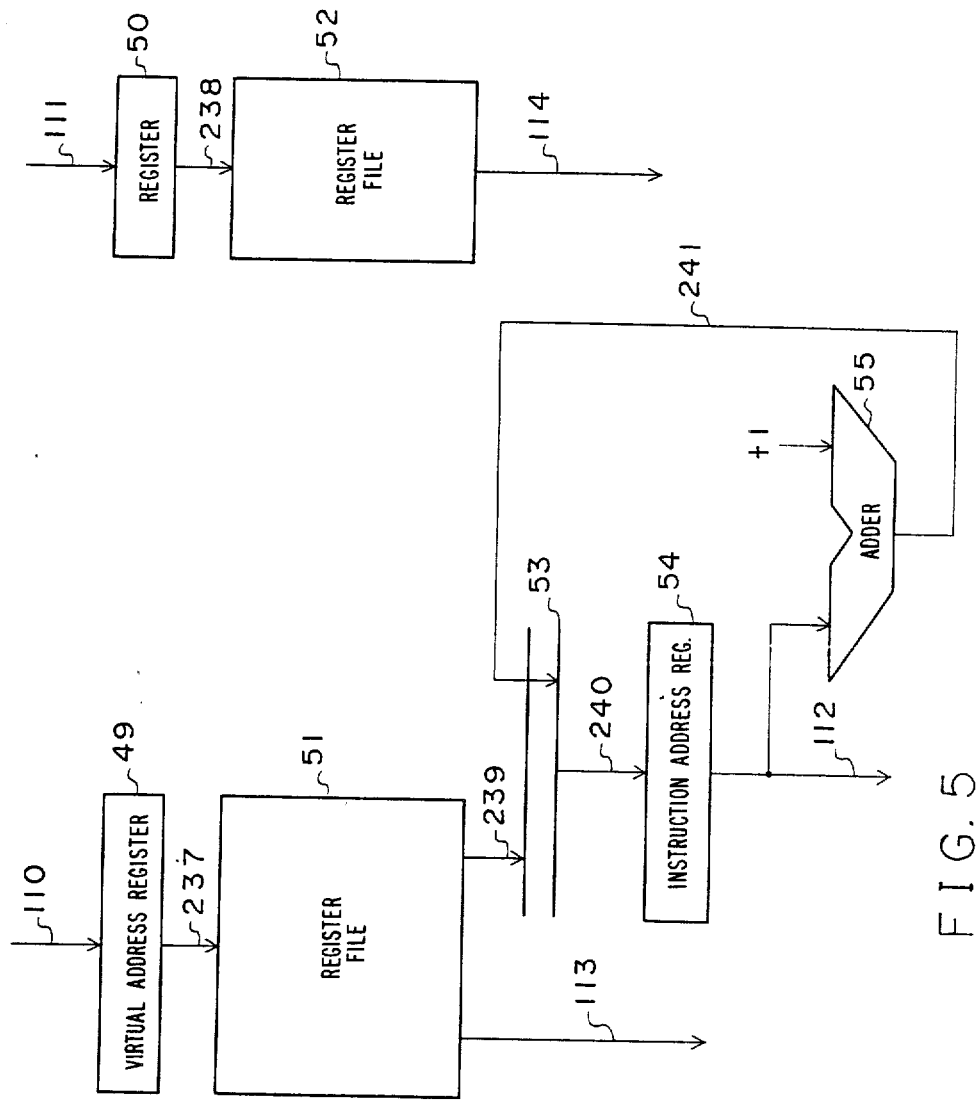
FIG. 5 is a detail block diagram of an instruction address stack 4 in FIG. 1.

In FIGS. 1 and 5, the virtual-branch-destination address delivered through the line 110 is stored in a virtual address register 49 included in the instruction address stack 4. The virtual-branch-destination address stored in the register 49 is shifted through a line 237 to a register file 51 which has stored the branch destination address.

The number of usable branch destination instructions and the mode information which are delivered through the line 111 are stored temporarily in a register 50, then shifted therefrom through a line 238 to a register file 52 and stored therein.

In the instruction prefetching process mentioned above, the virtual-instruction-prefetch address supplied through the virtual address register 49 to the register file 51 and stored therein is shifted through a line 239, a selector 53 and a line 240 to an instruction address register 54 and stored therein. The virtual-instruction-prefetch address in the register 54, the virtual branch destination address stored in the register file 51 and the number of usable branch destination instructions and the mode information both of which are stored in the register file 52 are delivered through a line 112, a line 113 and a line 114 to the branch-destination-predicting buffer 5, respectively.

Figure 6:
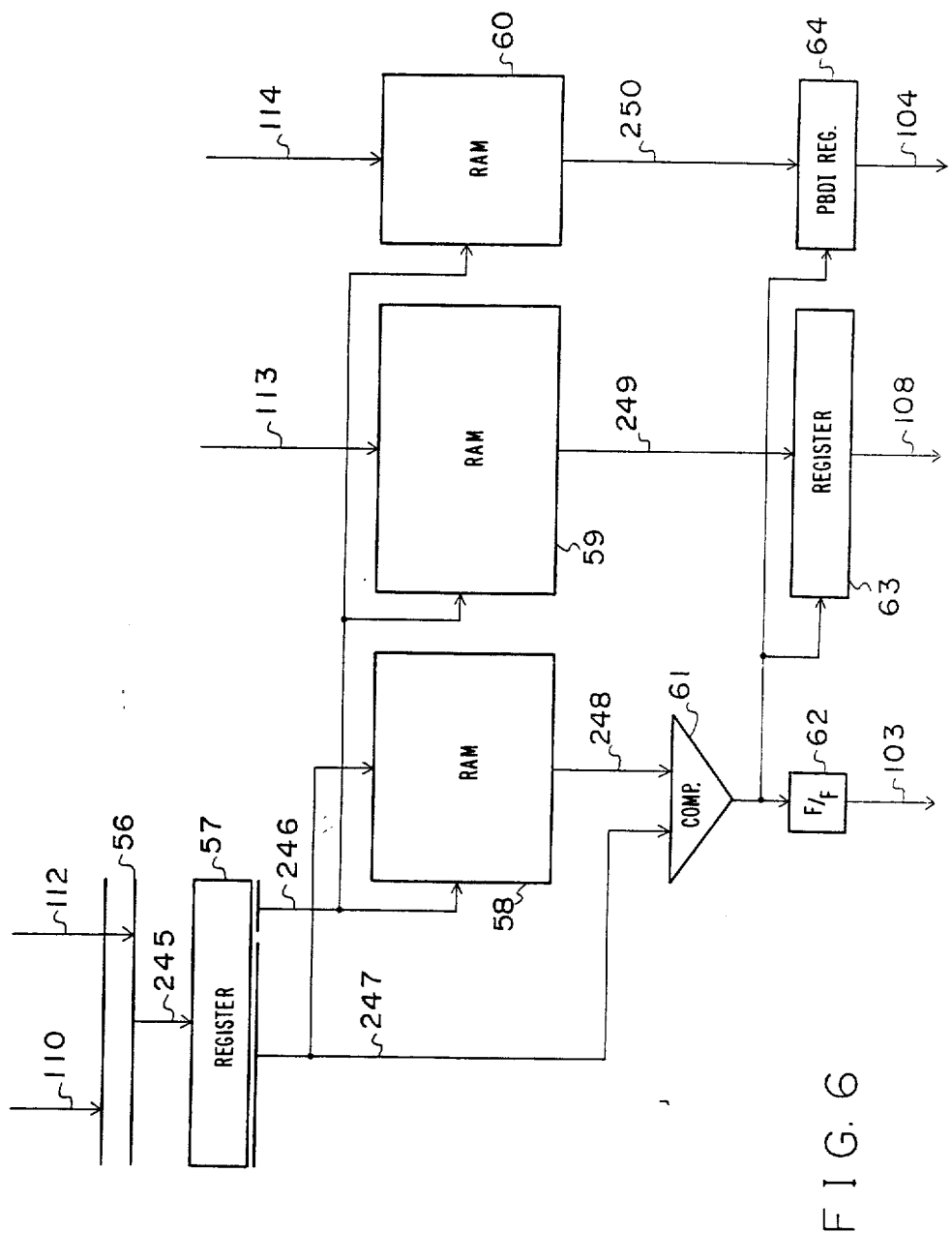
FIG. 6 is a detail block diagram of a branch destination prediction buffer 5.

Referring to FIGS. 1 and 6, the virtual-instruction-prefetch address delivered through the line 112 is shifted through the selector 56 of the branch destination predicting buffer 5 and a line 245 to a register 57 and stored therein. The register 57 is storing a write in address of the branch history table. The virtual-branch-instruction address stored in the register 57 is shifted to and stored in a random access memory 58 for address storage in response to low order bits delivered through a line 246. Also in response to the low order bits, the virtual branch destination address delivered through the line 113 is shifted to and stored in a random access memory 59 for storage of branch destination address of the branch instruction.

The number of usable branch instructions and the mode information delivered through the line 114 is also shifted to in response to the low order bits and stored in a random access memory 60 for storage of branch destination information of the branch instruction.

Thus, the write-in operation is completed.

A read-out operation will be described next.

First, an instruction prefetch processing of the read-out operation will be described referring to FIGS. 1 and 4. A prior prefetch address from the instruction-prefetch-address register 34 (FIG. 4) included in the branch-prefetch-address adder 3 shown in FIG. 1 is supplied to the effective-instruction-prefetch-address-adder 35. The prefetch address adder 3 adds n bytes to the prior prefetch address. A result of the addition is supplied through a line 225, a selector 37 and a line 226 to an effective-instruction-prefetch-address register 40 and stored therein. On the other hand, a base address derived from the instruction-segment-descriptor-register file 36 is supplied through the line 227, a selector 38 and the line 22 to an instruction-prefetch-base-register 41 and stored therein.

A virtual-instruction-prefetch-address adder 44 sums the effective-instruction-prefetch address given by the register 40 and the base address given by the register 41 to generate a virtual address for instruction prefetch. This virtual address is supplied through the line 236, a selector 46 and the line 110 to a virtual address register (49 in FIG. 5) included in the instruction address stack 4 and stored therein. The virtual address is also sent to the main memory (not shown). In response to the virtual address, an instruction is derived from the main memory through the line 100.

The virtual address is also supplied through the line 110 to the branch-destination-prediction buffer 5.

Next, the predicted branch-destination-prefetch process of the readout operation will be described, in detail.

Referring to FIGS. 1 and 6, the virtual address given via the line 110 is supplied through the selector 56 and a line 245 to a register 57 for storage of readout addresses of the branch history table and stored therein. Low order bits of the virtual address stored in the register 57 are sent, as an address, through the line 246 to a random access memory 58 for storage of branch instruction address. In response to the address, the memory 58 provides an instruction address on a line 248. A comparator 61 compares the instruction address given via the line 248 with the virtual address given via a line 247.

On the other hand, in response to low order bits of the virtual address for instruction prefetch which is given via the line 246, a virtual-branch-destination address of the branch instruction is provided on a line 249 from the memory 59 and at least one of the number of usable branch destination instructions and the mode information from the memory 60 is provided on a line 250. A comparison result of the comparator 61 is indicated in a flip-flop (F/F) 62 and at the same time supplied to a predicted branch-destination-information register 64. When the comparison result shows a coincidence, the F/F 62 is set and the predicted branch destination address and either the number of usable branch destination instructions or the mode information are set through the lines 249 and 250 in the registers 63 and 64, which are provided on lines 108 and 109, respectively.

Figure 3:
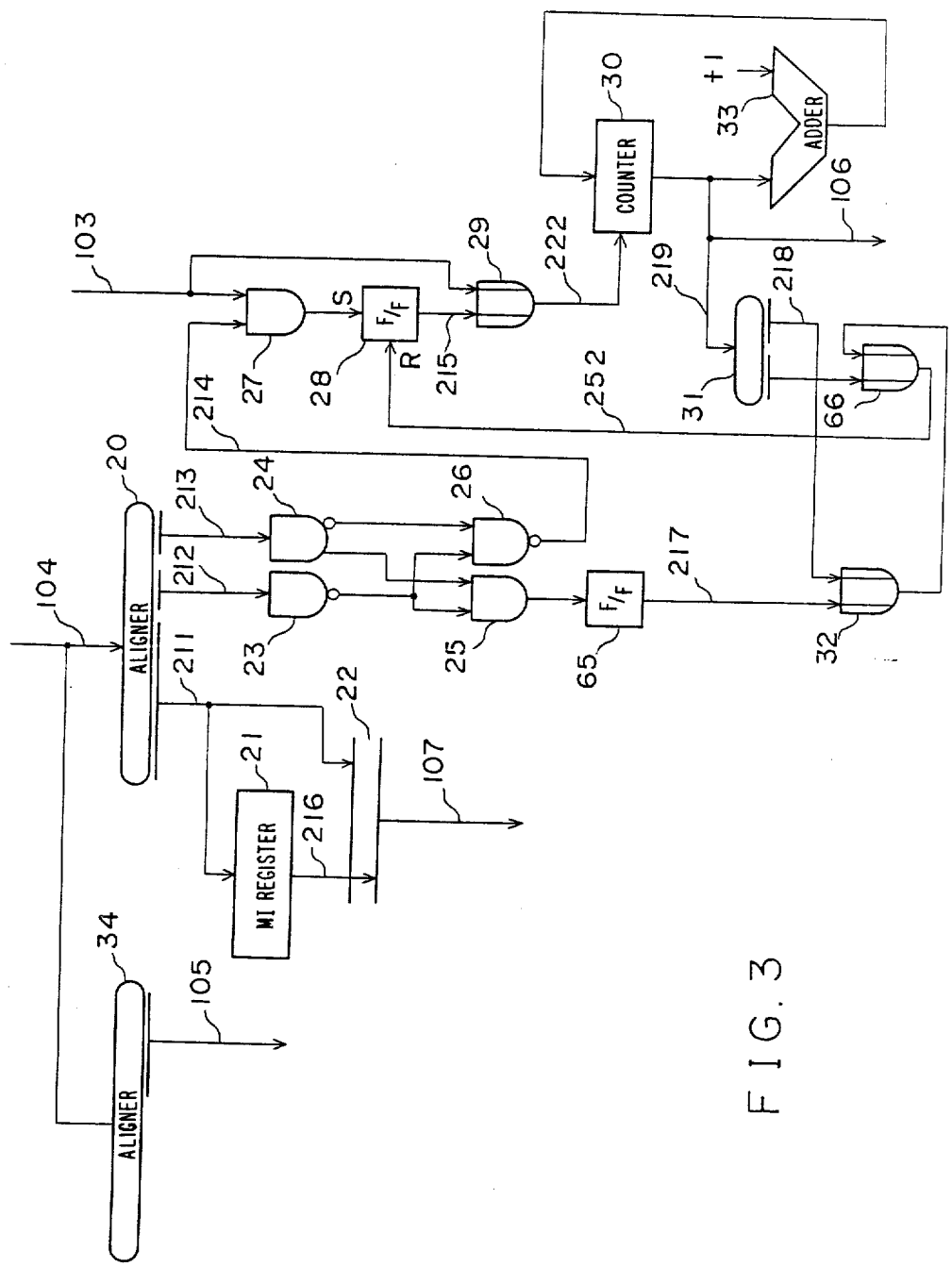
FIG. 3 is a detail block diagram of a branch prefetch control device 2 shown in FIG. 1.

Referring to FIGS. 1 and 3, the mode information given via a line 104 is sent to and stored in a mode information register 21 for subsequent request of predicted branch destination and also given through a selector 22 on a line 107. The number of residual instructions given through the line 104 is provided through the aligner '34 on a line 105. When the number of residual branch instructions is "1", the signals supplied through the line 104, an aligner 20 and a line 212 to a gate 23 and through a line 213 to the gate 24 are "0", respectively. Therefore, a signal to be sent through a NAND gate 26 and a line 214 to an AND gate 27 becomes "0" and, thus, a flip-flop (F/F) 28 for validity bit of the request number counter 30 is prevented from being set. Thus, the second and subsequent requests are prevented.

When the residual instruction number is "2", the signals to be sent through the line 104, the aligner 20 and the line 212 to the gate 23 and through the line 213 to the gate 24 are "0" and are "0" and "1", respectively, and so the output of the AND gate 25 becomes "1" upon which a flip-flop (F/F) 65 for validity bit is set to indicate the residual number being "2".

Referring to FIGS. 1 and 4, mode information given through the line 107 is sent through a selector 39 and a line 230 to the request mode register 42 and stored therein. The residual instruction number given through the line 105 is stored in a residual-instruction-number register 43 for circulation. An aligner 45 sends the mode information given through a line 233 and the residual instruction number given through a line 234 through a line 235 and a selector 47 onto the line 111.

An output of the F/F (62 in FIG. 6) of a branch-destination-prediction buffer 5 is sent through an OR gate 29 of the branch-destination-prediction-control device 2 shown in FIG. 3 and a line 222 to a request number counter 30 to activate the latter. The counter 30 is set to "0" as an initial value thereof. The value is sent through a line 106 to the instruction-prefetch-address adder 3.

At a first deriving of the content of the counter 30, the content is added, in a +1 adder 33 for request number counter, by a value "1" and a result is sent through a line 220 to the counter 30 and stored therein. The value of the counter 30 is sent through the line 106 to the instruction-prefetch-address adder 3. In the instruction-prefetch-address adder 3 shown in FIG. 4, the initial value "0" given through the line 106 is set in the base register 41 for instruction prefetch through the selector 38 and the line 229. The predicted branch destination address given through the line 108 is sent through the selector 37 and the line 226 to the effective address register 40 for instruction prefetch and stored therein. The virtual-instruction-prefetch-address adder 44 adds the predicted branch destination address given from the register 40 to the initial value "0" from the register 41 and provides the predicted branch destination address which is sent through the line 238, the selector 46 and the line 110 to the main memory. At the same time, the mode information stored in the register 42 is given through the line 233, the aligner 45, the line 235, the selector 47, an aligner 48 and the line 109 to the main memory and the predicted branch destination instruction is read out. Thus, the main portion of the read out operation completes. The predicted branch destination address and the residual instruction number are processed as follows.

In FIGS. 1 and 5, the predicted branch destination address given through the line 110 is stored in the virtual address register 49 and then through the line 237 in the register file 51. On the other hand, the residual instruction number given through the line 111 is stored in the register 50 and then through the line 238 in the register file 52.

Now, a second prefetch operation of the predicted branch destination instruction will be described with reference to FIGS. 1 to 4. Referring to FIGS. 3 an 4, at the second prefetch, a content of the mode information register 21 for subsequent of predicted branch destination is sent through a line 216, the selector 22, the line 107, the selector 39 and the line 230 to the request mode register 42. The value "1" in the request number counter 30 which was given by the first prefetch of the predicted branch destination instruction is sent through the line 106, the selector 38 and the line 229 to the base register 41 for instruction prefetch as "n". Since, at this time, the virtual address used in the first prefetch is kept in the effective address register 40 for instruction prefetch, "n" is added, in the prefetch address adder 44, to the virtual address and a result is sent through the line 236, the selector 46 and the line 110 to the main memory. Concurrently with this sending operation, the memory access mode signal is sent from the request mode register 42 through the line 233, the aligner 45, the line 235, the selector 47, the aligner 48 and the line 109 to the main memory.

At the second request, the output "1" of a validity bit flip-flop (F/F) 28 for the request number counter 30 is given through a line 215, the OR gate 29 and the line 222 to the request number counter 30 which is activated thereby. To the content of the counter 30, a value "1" is added in the adder 33 for request number counter 30 and a result is returned back to the latter through the line 220. At this time, the output of the V bit F/F 65 is "1" indicating that the residual instruction number is "2", which resets the validity bit F/F 28 for the request number counter 30 through the AND gate and an OR gate 66, by which a third request is prohibited. At the third request, a content of the mode information register 21 for subsequent request of predicted branch destination is supplied through the line 216, the selector 22, the line 107, the selector 39 and th line 230 to the request mode register 42. The value "2" of the request number counter 30 is supplied through the signal line 106, the selector 38 and the line 229 to the bas register 41 for instruction prefetch and stored therein as a base address "2n". The virtual-instruction-prefetch-address adder 44 sums the base address "2n" in the base register 41 and the virtual address of predicted branch destination stored in the effective address register 40 for instruction prefetch and a result is sent through the line 236, the selector 46 and the line 110 to the main memory. The output "2" of the request number counter 30 is supplied through the line 219 to an aligner 31 from which it is supplied through the OR gate 66 and a line 252 to the V bit F/F 28 for the request number counter 30 as a signal "1" to reset the F/F 28.

Upon the resetting of the latter, a production of request terminates when the number of requests becomes three.

The residual instruction number is used in this embodiment to control, in the instruction prefetch control device 2, the number or amount of prefetch of predicted branch destination. Therefore, the term "residual instruction number" may include the number of instruction prefetches, the number of residual bytes or the bound describing segments. Thus, the present invention makes possible to effectively restrict an excessive instruction prefetch exceeding the segment by limiting the number or amount of prefetch of branch destination instruction of branch prediction. Further the present invention makes possible to correctly access the memory in instruction prefetch operation of predicted branch destination by holding the memory access mode information of the branch destination in the branch history table corresponding to the branch destination address.

I claim:

1. An instruction prefetch control apparatus having a branch history table storing a paired branch instruction address and a branch destination address of a branch instruction for performing prefetch control of an instruction, said branch history table also storing said branch instruction and instruction-number-information, comprising:
   readout means for reading out said branch instruction from said branch history table in accordance with an instruction prefetch address;
   means for storing a number of instructions for indicating a number of possible instruction prefetches from a branch destination in said branch history table depending on said branch destination address;
   instruction-number-information storing means for storing said instruction-number-information obtained from said branch history table; and
   inhibiting means for inhibiting the number of instruction prefetches of a predicted branch destination on the basis of said instruction-number-information from said instruction-number-information storing means.

2. An instruction prefetch control apparatus having a branch history table storing a paired branch instruction address and a branch destination address of a branch instruction for performing prefetch control of the instruction, said branch history table also storing said branch instruction, branch destination memory access control information, and a branch destination, comprising:
- readout means for reading out said branch instruction from said branch history table in accordance with an instruction prefetch address;
- storage means for storing said branch destination memory access control information from said branch history table corresponding to said branch destination address; said branch destination access control information being a number of possible instruction prefetches from a branch destination in a branch history table; and
- means responsive to access control information read out from said branch history table for initiating a memory access of instruction prefetch and for inhibiting said memory access of instruction prefetches on basis of said branch destination memory access control information.

* * * * *